United States Patent
Aymeric et al.

(10) Patent No.: US 9,422,051 B2
(45) Date of Patent: Aug. 23, 2016

(54) HOVER HOLD AID SYSTEM FOR A HELICOPTER

(71) Applicant: Thales, Neuilly sur Seine (FR)

(72) Inventors: Bruno Aymeric, St Medard en Jalles (FR); Yannick Le Roux, St Medard en Jalles (FR); Sylvain Hourlier, Bordeaux (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 14/015,904

(22) Filed: Aug. 30, 2013

(65) Prior Publication Data

US 2014/0097291 A1   Apr. 10, 2014

(30) Foreign Application Priority Data

Aug. 31, 2012  (FR) .................................... 12 02340

(51) Int. Cl.
  *G06F 3/0481* (2013.01)
  *B64C 19/00* (2006.01)
  (Continued)

(52) U.S. Cl.
  CPC .............. *B64C 19/00* (2013.01); *G01C 23/005* (2013.01); *G05D 1/0858* (2013.01); *G02B 27/017* (2013.01); *G02B 2027/0141* (2013.01); *G02B 2027/0187* (2013.01)

(58) Field of Classification Search
  CPC ...... G06F 3/04815; G06F 3/00; G06F 3/012; G06G 1/626; G06T 19/006; G02B 27/017; G02B 2027/0181; G02B 27/076

USPC ......................................................... 345/7, 8
See application file for complete search history.

(56) References Cited

U.S. PATENT DOCUMENTS 6,208,349 B1 *  3/2001  Davidson et al. ............ 345/427
7,928,862 B1    4/2011  Matthews
(Continued)

FOREIGN PATENT DOCUMENTS

EP          2 388 760 A1     11/2011
WO   WO 2006/132713 A2     12/2006
(Continued)

OTHER PUBLICATIONS

French Search Report for French Counterpart Application No. FR 1202340, 10 pgs. (May 13, 2013).

(Continued)

*Primary Examiner* — Premal Patel
(74) *Attorney, Agent, or Firm* — Blakely, Sokoloff, Taylor & Zafman LLP

(57) ABSTRACT

Hover hold aid systems for helicopters are described. One system comprises a navigation system that determines a helicopter's current position in relation to a terrestrial frame of reference and a helmet-mounted visualization system comprising a helmet-mounted display (HMD) and at least one symbol generation processing device that generates symbols in the HMD at fixed positions in relation to the terrestrial frame of reference. The symbols are displayed in an angular field of display of the HMD. When the helicopter has to home or stay in a vicinity of a predetermined position, the at least one symbol generation processing device calculates a first and a second representation containing a first target and a second target referenced in the terrestrial frame of reference. The first target is located in the direction of the homing course to the predetermined position. The second target is located in a direction perpendicular to this same course.

22 Claims, 5 Drawing Sheets

(51) Int. Cl.
*G05D 1/08* (2006.01)
*G01C 23/00* (2006.01)
*G02B 27/01* (2006.01)

(56) References Cited

U.S. PATENT DOCUMENTS

2004/0061041 A1* 4/2004 Ben-Ari et al. .......... 250/203.1
2005/0237226 A1 10/2005 Judge et al.

FOREIGN PATENT DOCUMENTS

WO  WO 2009/081177 A2  7/2009
WO  WO 2012/003512 A2  1/2012

OTHER PUBLICATIONS

Taylor, "Rotorcraft visual situational awareness (VSA): solving the pilotage problem for landing in degraded visual environments," Proceedings of SPIE, vol. 7328, No. 73280G, pp. 1-12 (2009).
Reus et al., "Supporting the Helicopter Pilot in Degraded Visual Environments," Avionics Europe Conference and Exhibition, pp. 1-22 (Mar. 2012).

* cited by examiner

HOVER HOLD AID SYSTEM FOR A HELICOPTER

BACKGROUND OF THE INVENTION

1. Field of the Invention

The area of the invention is that of helicopter piloting and more particularly very precise holding of a hovering position above a predetermined location. This holding is made all the more difficult by poor visibility conditions or when the helicopter is subject to snow or dust turbulence raised by the rotating blades. These are known as "white out" or "brown out" phenomena.

2. Description of the Prior Art

To enable a more accurate appreciation of the situation of the helicopter, it has been proposed to present the situation of the helicopter in relation to the terrain to the pilot on the visualization means of the control panel. Thus, the patents or patent applications EP 2 388 760, EP 1 882 157 and WO 2012 003512 present devices in which the situation of the helicopter is represented on the visualization screens of the control panel. The patent U.S. Pat. No. 7,928,862 discloses a Head-Up Display device in which the position information is presented superimposed on the outside landscape in the central field of vision of the pilot.

These devices all have the drawback of giving information partly outside of the pilot's useful field of view. In fact, helicopter pilots learn to master hovering by observing the terrain situated opposite them and laterally to the sides. The structural extremities of the helicopter cockpit represent reference points which make it possible to judge the horizontal and vertical movements of the helicopter. Lateral vision is thus essential for precise hover holding.

Thus, the methods of presenting existing information lead the pilot to operate in a mode that is no longer familiar to him and which is not necessarily the most suitable.

SUMMARY OF THE INVENTION

The aid system according to the invention does not have these drawbacks. On modern helicopters, the pilots wear helmets including helmet-mounted displays. It is then possible to present information perfectly superimposed on the outside landscape in a large region of angular swing of the pilot's head. It is thus possible to present precise hover information in conditions close to those habitually used by the pilot.

More precisely, the subject of the invention is a hover hold aid system for a helicopter, said system comprising at least:

a navigation means enabling the determination of the current position of the helicopter in flight in relation to a terrestrial frame of reference;

a helmet-mounted visualization system containing a helmet posture detection device, a helmet-mounted display incorporated in the helmet of the pilot of said helicopter and means for generating symbols in said helmet-mounted display at fixed positions in relation to said terrestrial frame of reference, said symbols being displayed when the latter are situated in the angular field of display of the helmet-mounted display;

characterized in that, when the helicopter has to home or be held in the vicinity of a predetermined position in said terrestrial frame of reference, the symbol generation means calculate a first representation containing a first target and a second representation containing a second target, said targets being referenced in said terrestrial frame of reference, the first target located in the direction of the homing course to the predetermined position, the second target located in a direction perpendicular to said homing course.

Advantageously, the first representation contains a first index corresponding to the homing course and the second representation contains a second index corresponding to a direction perpendicular to the homing course.

Advantageously, the first representation and the second representation contain, at the level of the first index and of the second index. two perpendicular lines, the two lines intersecting at the centre of each index, the first line representing the horizon.

Advantageously, the first representation contains, at the level of the first index, a first indication of the vertical velocity of the helicopter and of the lateral velocity of the helicopter in a direction perpendicular to the course, and in that the second representation contains, at the level of the second index, a second indication of the vertical velocity of the helicopter and of the velocity in the direction of the course of the helicopter.

Advantageously, the first representation contains a first model representative of the attitude of the helicopter in a plane perpendicular to the direction of the course and the second representation contains a second model representative of the attitude of the helicopter in a vertical plane parallel to the direction of the course.

Advantageously, the first representation and the second representation contain a top view representing at least the predetermined position and the current position of the helicopter, said view being referenced in the terrestrial frame of reference.

Advantageously, the first target contains at least two identical vertical bars and some horizontal bars parallel to each other, parallel to the direction of the course and displayed in perspective.

Advantageously, the first target contains a longitudinal index representative of the distance separating the helicopter from the predetermined position.

Advantageously, the second target contains at least two identical vertical bars and some horizontal bars parallel to each other and parallel to the direction of the course.

Advantageously, the first representation and the second representation contain representations of dangerous or forbidden zones located at the sites that they occupy on the terrain.

BRIEF DESCRIPTION OF THE DRAWINGS

The invention will be better understood and other advantages will appear upon reading the following in-no-way-limiting description using the appended figures in which.

DETAILED DESCRIPTION

Figure 1:
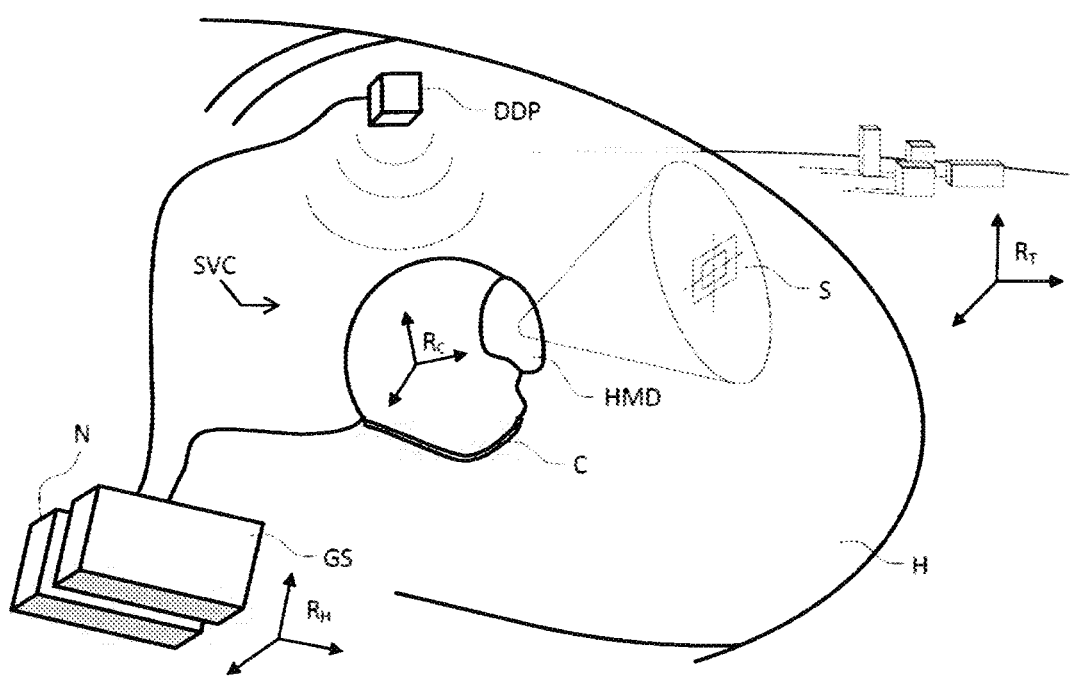
FIG. 1 represents a block diagram of the hover hold aid system for a helicopter according to the invention.

FIG. 1 represents a block diagram of a hover hold aid system according to the invention, for a helicopter H. The system is arranged inside the helicopter H. The aid system contains a navigation means N enabling the determination of the current position of the helicopter in flight in relation to a terrestrial frame of reference RT, the helicopter being referenced in a frame of reference RH. These means generally includes an Inertial Measurement Unit, velocity and acceleration measurement sensors, an altimeter or a radar altimeter, satellite positioning unit, etc. The aid system also contains a helmet-mounted visualization system SVC containing a helmet posture detection device DDP, a helmet-mounted display HMD incorporated in the helmet C of the pilot of said helicopter and symbol generation means GS, the helmet being referenced in a frame of reference RC. In FIG. 1, the symbol S displayed in the helmet is a target. Various techniques exist for carrying out the detection of the position of the helmet and the helmet-mounted display. These techniques, which rely on principles of optical or electromagnetic detection, are known to those skilled in the art and are not further detailed in this description.

Using this helmet-mounted visualization system, it is possible to determine the position of the helmet in the frame of reference of the helicopter and also in the terrestrial frame of reference. It is thus possible to display fixed symbol sets in the terrestrial frame of reference. The system also contains a man-machine interface making it possible to manage, control and parameterize the entirety of the system SVC. This interface, which can take various forms, is not represented in FIG. 1.

Traditionally, the symbol set displayed is situated in the vicinity of the axis of the helicopter. The peculiarity of the system SVC according to the invention is that the system generates a symbol set simultaneously in the axis and also at 90 degrees to this axis in a direction which, according to the position of the pilot in the helicopter, is situated either on his left, or on his right. Thus, by turning his head, the pilot switches from a first symbol set to a second. Together, these two symbol sets allow him to perfectly define the separations in a three-dimensional space in relation to a determined position, thus best ensuring the hovering of the helicopter. Moreover, this switch from one symbol set to the other perfectly matches the modus operandi of helicopter pilots when they have to ensure hovering without any particular aid.

More precisely, when the helicopter has to home or be held in the vicinity of a predetermined position located in a terrestrial frame of reference, the symbol generation means GS calculate a first representation containing at least one first target and a second representation containing at least one second target, said targets being referenced in said terrestrial frame of reference and arranged in the conformal position, the first target located in the direction of the homing course to the predetermined position, the second target located in a direction perpendicular to said homing course. As used herein, a conformal position of a symbol refers to the virtual position the symbol is supposed to occupy in a terrestrial frame of reference.

Figure 2:
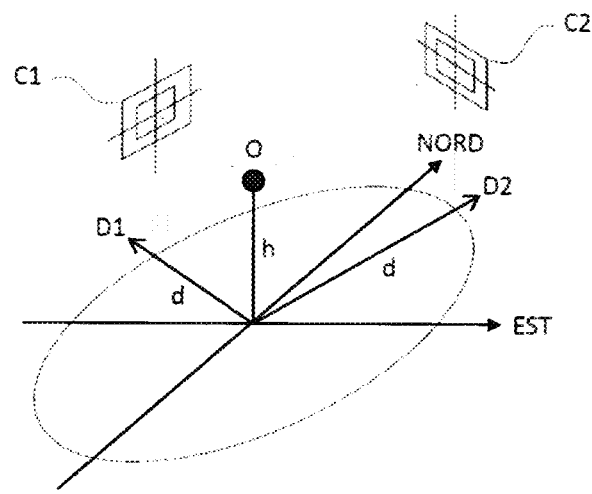
FIG. 2 represents a three-dimensional view of the position of the targets generated by the symbol set.

FIG. 2 represents a three-dimensional view of the position of the targets generated by the symbol set in a terrestrial frame of reference RT oriented along the cardinal points (NORD and EST in FIG. 2). The predetermined hover position of the helicopter is situated at the point O centered on the terrestrial frame of reference and is situated at an altitude h. The desired helicopter course for the hover phase lies in the direction D1, and the direction perpendicular to the direction D1 is denoted D2. The targets C1 and C2 generated by the symbol set generation means GS, are situated at a virtual distance d from the point O. The target C1 is generated in the direction D1 of the desired helicopter course and the target C2 is generated in the direction D2 perpendicular to the helicopter course.

Figure 3:
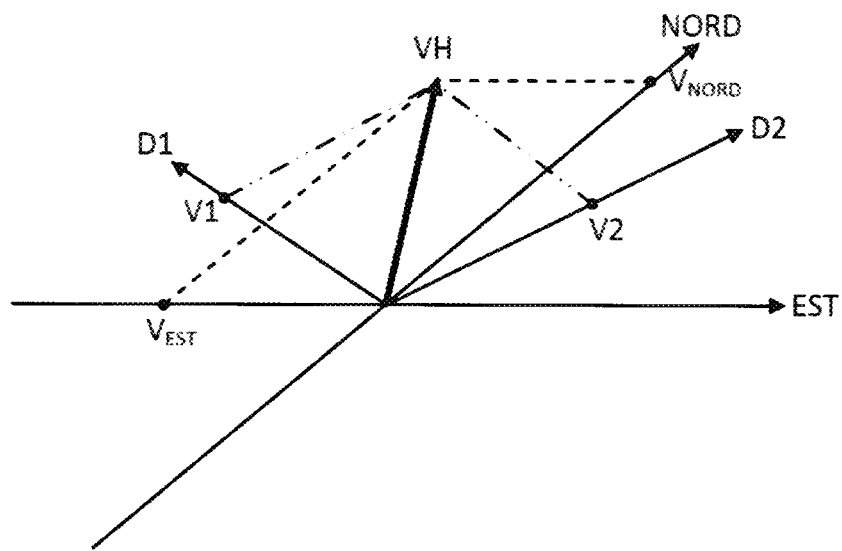
FIG. 3 represents the decomposition of the velocity vector of the helicopter in a particular frame of reference.

FIG. 3 represents the horizontal component VH of the helicopter velocity in the two previous frames of reference. In the terrestrial frame of reference (EST, NORD), this component VH has coordinates ($V_{EST}$, $V_{NORD}$). In the frame of reference (D1, D2), this component has coordinates (V1, V2).

The generation of symbols according to the invention is achieved in the following manner:

Acquisition of the predetermined position which may be, as seen in FIG. 2, the combination of a latitude/longitude position and of a height h and of the desired course in the direction D1;

Parameterization by the pilot of the distance between the predetermined hover position and the targets C1 and C2. The closer the targets, the better the piloting sensitivity. In the phase of acquisition of the position, the pilot may choose a large distance, then reduce it to refine the precision of the holding of his helicopter position Calculation of the coordinates of two targets C1 and C2 in the terrestrial frame of reference, upon a request to initialize hover parameters, that is to say:

A target C1 in the direction of the desired course;

A target C2 in the perpendicular direction. The target C2 is situated on the right if the pilot is in the right-hand seat, otherwise on the left;

At each display cycle, the aid system performs the following operations:

Acquisition of the position and of the attitudes of the helicopter;

Acquisition of the orientation of the pilot's head;

Calculation of the position of the targets in the frame of reference linked to the display screen of the helmet and display of said targets in the helmet-mounted display. This calculation consists in applying a rotation matrix to the vector starting from the helicopter and ending at the target. This transformation matrix is calculated from the data on the helicopter attitude in relation to the terrestrial frame of reference, and on the position of the pilot's head in relation to the helicopter. The complete calculation carries out this transformation for several points on the target. If the targets are not visible, they are not displayed. In fact, one target alone is displayed at any time;

Calculation of the other symbol sets surrounding the targets C1 and C2.

Figure 7:
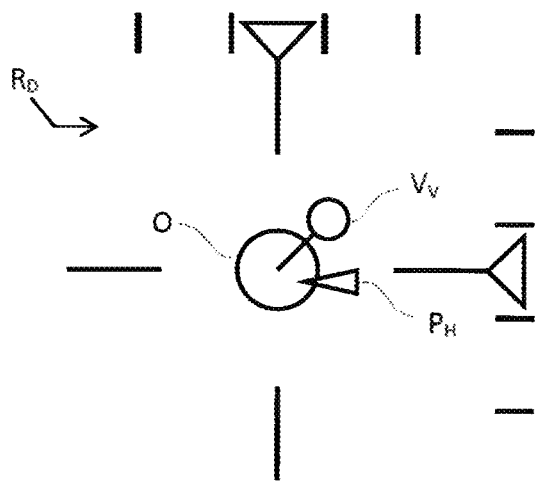
FIG. 7 represents a fourth depiction containing a top view of the situation of the helicopter.
Figure 8:
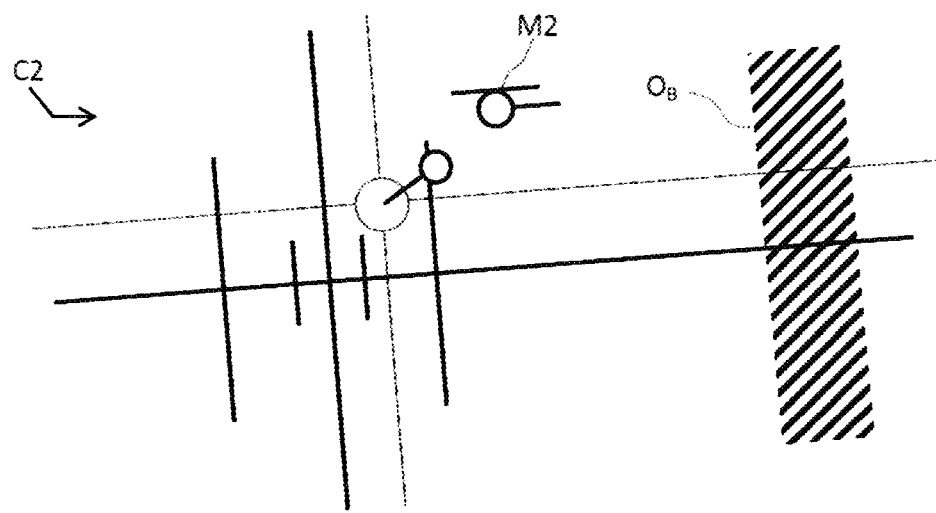
FIG. 8 represents a fifth depiction containing a second target and the representation of an obstacle.
Figure 9:
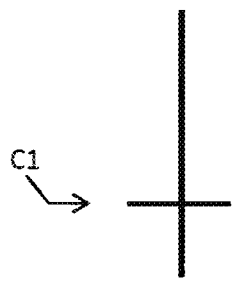
FIGS. 9 and 10 represent sixth and seventh depictions representing a helicopter on approach to a hover position.
Figure 10:
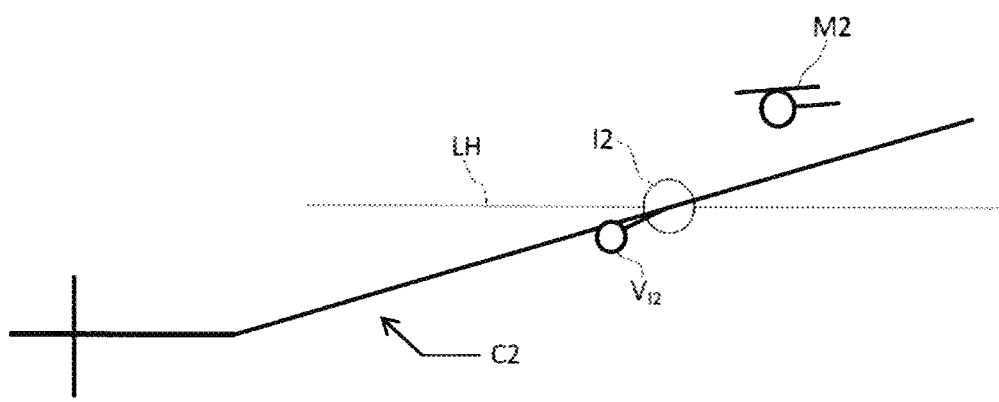

By way of non-limiting examples, FIGS. 4 to 10 represent symbol sets according to the invention. These symbol sets are represented in the frame of reference of the pilot's helmet. They therefore conform with what he sees. FIGS. 4 to 8 are more particularly dedicated to holding the hover. FIGS. 9 and 10 are representative of the depictions representing a helicopter on approach.

These symbol sets may have many variants according to the type of craft, the systems used and the missions. it is however necessary that the symbols retain simple geometrical shapes so as not to pointlessly encumber the view of the outside landscape on which they are superimposed. There may notably be some variety regarding the graphical representations of the targets and of the other symbols contained in these figures. It is also possible to vary the colours, the brightness or the flashing of the displayed symbols. These simple variants remain within the scope of this invention.

Figure 4:
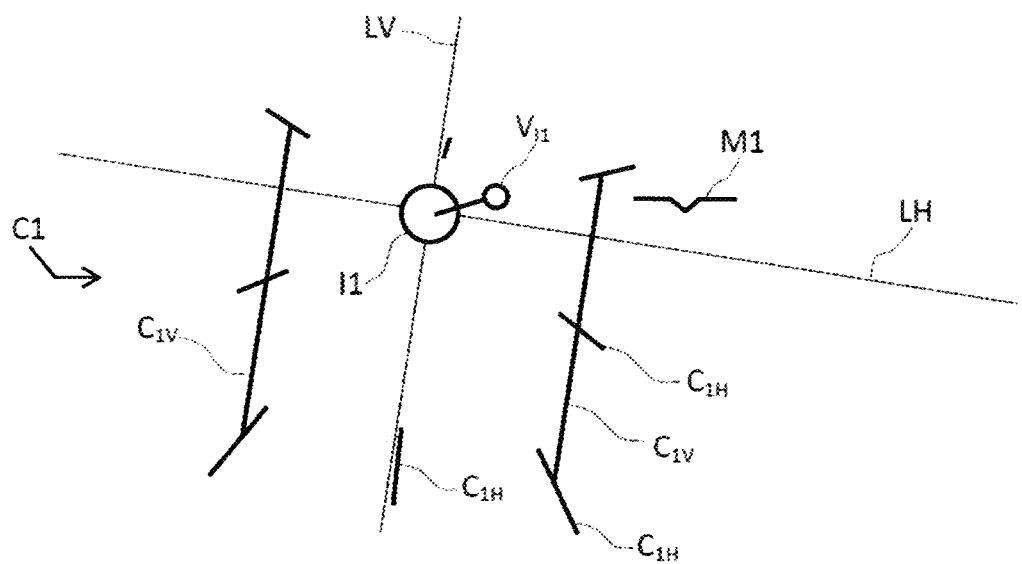
FIG. 4 represents a first depiction containing a first target.

FIG. 4 is a first depiction representing a first representation. This first representation contains a first target represented in bold lines in FIG. 4. This first target C1 contains two parallel lines $C_{1V}$ of the same length and arranged vertically within a terrestrial frame of reference. The target also contains eight horizontal bars $C_{1H}$ parallel to each other, parallel to the direction of the course and displayed in perspective. These bars are situated at the ends and in the middle of the two parallel vertical lines. This form of symbol set means that the target represents a volume—in this case a hollow cylinder with a square cross section—in a stylized manner and as seen by the pilot.

The first representation also contains a first index corresponding to the homing course represented by a circle I1. It corresponds to the vanishing point of the horizontal bars of the target C1. This index is arranged at the intersection of two perpendicular lines, the first line LH representing the horizon and the second line LV the vertical.

The first representation contains at the level of the first index I1 a first indication $V_{f1}$ of the vertical velocity of the helicopter and of the lateral velocity of the helicopter in a direction perpendicular to the course. It is represented in the form of a line terminated by a circle. The orientation of the line gives the orientation of the velocity, the length of the line is representative of the value of the velocity.

Finally, the first, representation contains a first model M1 representing the attitude of the helicopter in a plane perpendicular to the direction of the course. It is traditionally represented by a V terminated by two horizontal lines symbolizing the helicopter seen front-on.

Figure 5:
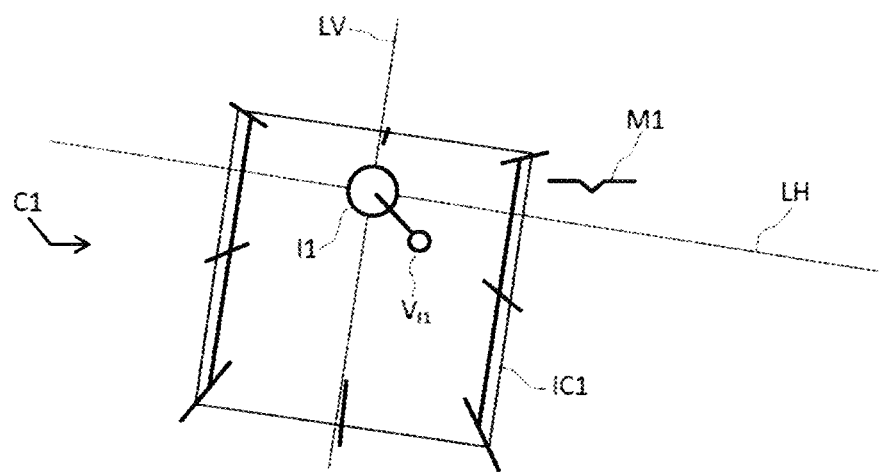
FIG. 5 represents a second depiction containing a first target.

FIG. 5 is a second depiction representing a variant of the first previous representation. This FIG. 5 differs from the previous FIG. 4 by the addition of a longitudinal separation index IC1. In FIG. 5, this index has the shape of a square aligned on the vertical and horizontal bars of the target C1. The position of this index in relation to the horizontal bars informs the pilot of the separation existing in the direction of the course between the position of the helicopter and the predetermined position of the hover. The pilot therefore has access in frontal vision to all the information needed to pilot the helicopter. However, this indicator does not exhibit great accuracy. It is useful to add either as a complement or in substitution a second representation containing a second target located in a direction perpendicular to the homing course.

Figure 6:
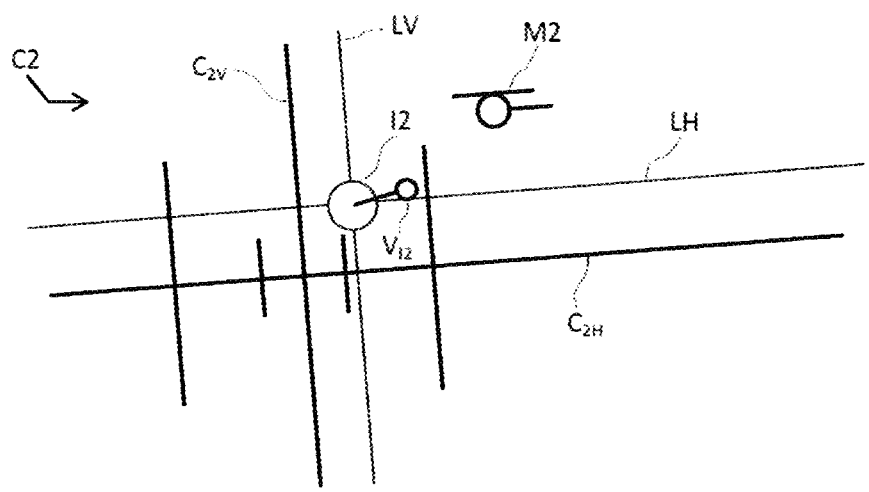
FIG. 6 represents a third depiction containing a second target.

FIG. 6 is a third depiction representing a second representation. This second representation contains a second target C2 represented in bold lines in FIG. 6. This second target essentially contains, in the mariner of the reticule on a sight, two perpendicular lines, one vertical $C_{2V}$ and the other horizontal $C_{2H}$ and vertical and horizontal secondary graduations. Like the previous representation, this second representation also contains:

a second index I2 corresponding to the homing course represented by a circle. This index is perpendicular to the direction of the course corresponding to the target C2;

at the level of the second index I2, a second indication $V_{f2}$ of the vertical velocity of the helicopter and of the lateral velocity of the helicopter in a direction parallel to the course. It is represented in the shape of a line terminated by a circle. The orientation of the line gives the orientation of the velocity, the length of the line is representative of the value of the velocity;

a second model M2 representative of the attitude of the helicopter in a plane parallel to the direction of the course. This model M2 symbolically represents a helicopter in profile view.

FIG. 7 represents a top view of the situation of the helicopter in a horizontal plane. This view may be added to the first representation or to the second representation. This view is referenced in the terrestrial frame of reference. It contains at least one graduated frame of reference $R_D$, the predetermined position O and the current position of the helicopter $P_H$ and an indicator of the velocity $V_V$ of the helicopter. This top view is arranged in a terrestrial frame of reference and thus turns with the orientation of the head.

FIG. 8 is a fifth depiction representing a second representation. It is a variant of the representation of FIG. 6. This second representation contains the representation of an obstacle $O_B$. This obstacle is represented in conformal view at the place it occupies on the terrain. By way of non-limiting example, in the case of FIG. 6. this obstacle is represented by a hatched rectangle. Of course, the first representation may also contain the representation of such obstacles.

FIGS. 9 and 10 are representative of the depictions representing a helicopter on high approach to a fixed hover point.

As seen in FIG. 9, the target C1 is then extended upwards to allow the lateral alignment of the helicopter. In FIG. 10. the target C2 is extended upstream of the target position. Thus, by looking to the side, the pilot may be certain that his helicopter is descending in the desired vertical plane.

What is claimed is:

1. A hover hold aid system for a helicopter, the system comprising:

a helmet-mounted visualization system comprising a helmet posture detection device and a helmet-mounted display incorporated in a helmet of a pilot of the helicopter, wherein the helmet-mounted visualization system determines a current position of the helicopter in relation to a terrestrial frame of reference, and the helmet-mounted display generates symbols at fixed virtual positions in relation to the terrestrial frame of reference, the symbols being displayed when the symbols are situated in an angular field of display of the helmet-mounted display;

wherein, when the helicopter has to home or be held in a vicinity of a predetermined position in the terrestrial frame of reference, the helmet-mounted visualization system calculates a first representation containing a first target and a second representation containing a second target, the first and second targets being referenced in the terrestrial frame of reference, the first target located in a direction of a homing course to the predetermined position, the second target located in a perpendicular direction to the homing course, the direction of the homing course and the direction perpendicular to the homing course being referenced in relation to the current position of the helicopter, one target alone being displayed at any time, depending on an orientation of the helmet.

2. The hover hold aid system according to claim 1, wherein the first representation contains a first index corresponding to the homing course and the second representation contains a second index corresponding to the direction perpendicular to the homing course.

3. The hover hold aid system according to claim 2, wherein the first representation and the second representation contain, at a level of the first index and a level of the second index, two perpendicular lines, the two lines intersecting at a center of each index, a first line of the two lines representing a horizon.

4. The hover hold aid system according to claim 2, wherein the first representation contains, at the level of the first index, a first indication of a vertical velocity of the helicopter and of a lateral velocity of the helicopter in the direction perpendicular to the course, and in that the second representation contains, at the level of the second index, a second indication of the vertical velocity of the helicopter and of the lateral velocity in the direction of the course.

5. The hover hold aid system according to claim 1, wherein the first representation contains a first model representative of an attitude of the helicopter in a plane perpendicular to the direction of the course and the second representation contains a second model representative of an attitude of the helicopter in a vertical plane parallel to the direction of the course.

6. The hover hold aid system according to claim 1, wherein the first representation and the second representation contain a top view representing at least the predetermined position and the current position of the helicopter, the view being referenced in the terrestrial frame of reference.

7. The hover hold aid system according to claim 1, wherein the first target contains at least two identical vertical bars and at least two horizontal bars parallel to each other, parallel to the direction of the course, and displayed in perspective.

8. The hover hold aid system according to claim 7, wherein the first target contains a longitudinal index representative of a distance separating the helicopter from the predetermined position.

9. The hover hold aid system according to claim 1, wherein the second target contains at least two identical vertical bars and at least two horizontal bars parallel to each other and parallel to the direction of the course.

10. The hover hold aid system according to claim 1, wherein the first representation and the second representation include one or more representations of dangerous or prohibited zones located at sites occupied by the first and second representations on a terrain.

11. The hover hold aid system according to claim 1, wherein the helmet-mounted visualization system includes at least one of:
an Inertial Measurement Unit,
a velocity measurement sensor,
an acceleration measurement sensor,
an altimeter,
a radar altimeter, or
a satellite positioning sensor.

12. A method for a hover hold aid system holding a helicopter in a hovering position above a predetermined location, the method comprising:
determining a current position of the helicopter in relation to a terrestrial frame of reference, wherein the hover hold aid system includes a helmet-mounted visualization system, a helmet posture detection device, and a helmet-mounted display incorporated in a helmet of a pilot of the helicopter;
generating symbols in the helmet-mounted display at fixed virtual positions in relation to the terrestrial frame of reference;
displaying the symbols when the symbols are situated in an angular field of display of the helmet-mounted display; and
when the helicopter has to home or be held in a vicinity of a predetermined position in the terrestrial frame of reference, calculating a first representation containing a first target and a second representation containing a second target, the first and second targets being referenced in the terrestrial frame of reference, the first target located in a direction of a homing course to the predetermined position, the second target located in a perpendicular direction to the homing course, the direction of the homing course and the direction perpendicular to the homing course being referenced in relation to the current position of the helicopter, one target alone being displayed at any time, depending on an orientation of the helmet.

13. The method of claim 12, wherein the first representation contains a first index corresponding to the homing course and the second representation contains a second index corresponding to the direction perpendicular to the homing course.

14. The method of claim 13, wherein the first representation and the second representation contain, at a level of the first index and a level of the second index, two perpendicular lines, the two lines intersecting at a center of each index, a first line of the two lines representing a horizon.

15. The method of claim 13, wherein the first representation contains, at the level of the first index, a first indication of a vertical velocity of the helicopter and of a lateral velocity of the helicopter in the direction perpendicular to the course, and in that the second representation contains, at the level of the second index, a second indication of the vertical velocity of the helicopter and of the lateral velocity in the direction of the course.

16. The method of claim 12, wherein the first representation contains a first model representative of an attitude of the helicopter in a plane perpendicular to the direction of the course and the second representation contains a second model representative of an attitude of the helicopter in a vertical plane parallel to the direction of the course.

17. The method of claim 12, wherein the first representation and the second representation contain a top view representing at least the predetermined position and the current position of the helicopter, the view being referenced in the terrestrial frame of reference.

18. The method of claim 12, wherein the first target contains at least two identical vertical bars and at least two horizontal bars parallel to each other, parallel to the direction of the course, and displayed in perspective.

19. The method of claim 18, wherein the first target contains a longitudinal index representative of a distance separating the helicopter from the predetermined position.

20. The method of claim 12, wherein the second target contains at least two identical vertical bars and at least two horizontal bars parallel to each other and parallel to the direction of the course.

21. The method of claim 12, wherein the first representation and the second representation include one or more representations of dangerous or prohibited zones located at sites occupied by the first and second representations on a terrain.

22. The method of claim 12, wherein the helmet-mounted visualization system includes at least one of:
an Inertial Measurement Unit,
a velocity measurement sensor,
an acceleration measurement sensor, an altimeter,
a radar altimeter, or
a satellite positioning sensor.

* * * * *